United States Patent [19]

Jadrich et al.

[11] Patent Number: 5,392,662

[45] Date of Patent: Feb. 28, 1995

[54] LEADSCREW COUPLER

[75] Inventors: Bradley S. Jadrich, Rochester; Mark E. Bridges, Spencerport, both of N.Y.

[73] Assignee: Eastman Kodak Company, Rochester, N.Y.

[21] Appl. No.: 123,838

[22] Filed: Sep. 20, 1993

[51] Int. Cl.⁶ .................... F16H 25/20; F16D 3/52
[52] U.S. Cl. .................... 74/89.15; 267/160; 403/220; 464/51; 464/100
[58] Field of Search .......... 74/89.15; 267/160; 403/220, 223; 464/51, 100

[56] References Cited

U.S. PATENT DOCUMENTS

| | | | |
|---|---|---|---|
| 1,525,026 | 2/1925 | Dickerman | 464/51 X |
| 2,591,769 | 4/1952 | Beechler | 267/160 X |
| 3,393,535 | 7/1968 | Morin | 403/220 X |
| 3,745,840 | 7/1973 | Guralnick | 74/89.15 |
| 3,974,706 | 8/1976 | Danko, Jr. | 74/89.15 |
| 4,302,981 | 12/1981 | Wayman | 74/89.15 |
| 4,372,222 | 2/1983 | Tice | 74/89.15 X |
| 4,516,958 | 5/1985 | Phillips | 464/100 X |
| 4,530,251 | 7/1985 | Henle | 74/89.15 |
| 4,597,303 | 7/1986 | Nakaya | 74/89.15 |

FOREIGN PATENT DOCUMENTS

| | | | |
|---|---|---|---|
| 3623112 | 1/1987 | Germany | 74/89.15 |
| 1337587 | 9/1987 | U.S.S.R. | 74/89.15 |
| 1581903 | 7/1990 | U.S.S.R. | 464/51 |

*Primary Examiner*—Allan D. Herrmann
*Attorney, Agent, or Firm*—Milton S. Sales

[57] ABSTRACT

A relatively inexpensive coupling for preventing the transmission of thread drunkenness to a carriage or other element being driven by a lead screw. The coupling is formed with an input plate and an output plate both connected to an intermediate member. The connections via flexure members permit movement of the intermediate member relative to the coupling and the output plate to provide uniform motion to a carriage along the lead screw axis.

11 Claims, 3 Drawing Sheets

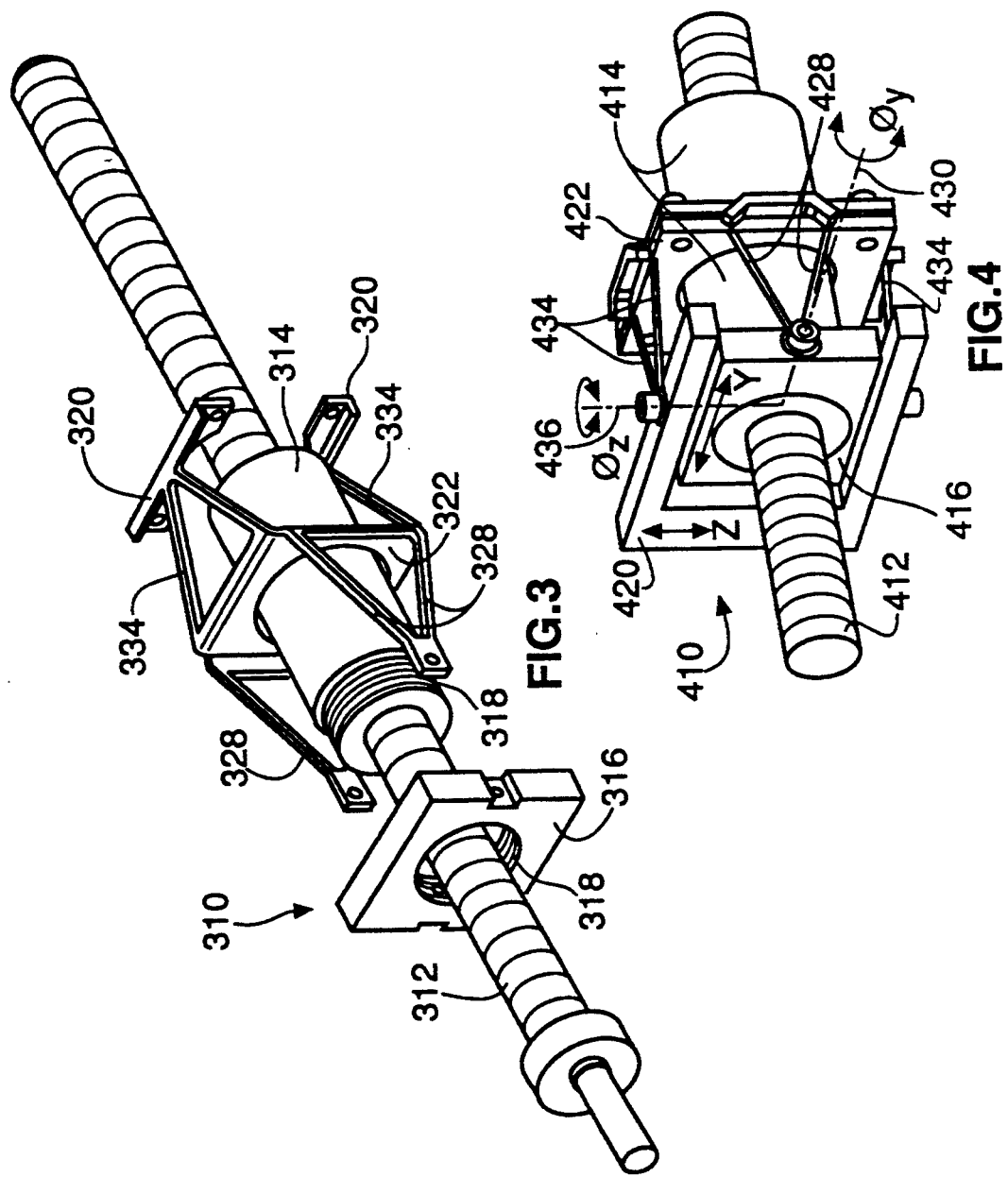

5,392,662

LEADSCREW COUPLER

FIELD OF THE INVENTION

The present invention is directed to a leadscrew coupler for precision devices using a leadscrew to move one element relative to another without transferring periodic variations occurring in the threads of the lead screw to the other element and, more particularly, to a coupler for use in apparatus for the generation of prints from electronic data wherein the transfer of such leadscrew variations would degrade the resulting image.

BACKGROUND OF THE INVENTION

It is known that periodic velocity variations superimposed upon the nominally constant velocity of a print head in a scan printing apparatus produce an image defect known as "banding". Inasmuch as lead screws are commonly used to move the print head during scan printing, the typical characteristic of lead screws to have subtle, once per revolution, errors manufactured into their threads, sometimes known as "thread drunkenness", unfortunately results in image banding.

Efforts at eliminating the effect of thread drunkenness on images produced by such scanning systems has resulted in requiring ever higher precision lead screws at higher and higher costs. Unfortunately, this has increased the cost of such printers while not entirely eliminating the problem.

SUMMARY OF INVENTION

Thus, the present invention provides a relatively inexpensive means of preventing the transmission of leadscrew unevenness to a carriage or other element being driven by a lead screw.

According to one aspect of the present invention, a coupling is provided for transferring motion from a leadscrew nut to a carriage comprising a coupler member arranged to engage the leadscrew nut, an intermediate member is connected to the coupler member, and a carriage connecting means connects the coupler to a carriage. A first means is provided for connecting the intermediate member to the carriage to locate the carriage with respect to the leadscrew nut along the axis of the leadscrew. The intermediate member is connected to the carriage to permit movement of the intermediate member relative to the carriage by rotation about a first pivot axis substantially perpendicular to the axis of the leadscrew. A second means is provided for connecting the coupling member to the intermediate member to locate the intermediate member with respect to the leadscrew nut along the axis of the leadscrew and to permit rotation of the intermediate member about a second pivot axis substantially perpendicular to the axis of the leadscrew and substantially perpendicular to the first pivot axis. The first and second connecting means permit first and second transverse movement of the intermediate member substantially perpendicular to the axis of the leadscrew and parallel to the first and second pivot axes whereby movement of the leadscrew transverse to the axis thereof is not transmitted to the carriage.

According to another aspect of the present invention a leadscrew coupling is provided wherein the first and second connecting means are flexure members. Further, the first pivot axis passes through the carriage connecting means and the second pivot axis passes through the coupler member.

In accordance with still another aspect of the present invention, a leadscrew coupling is provided wherein the first and second pivot axes pass through both the coupling member and the carriage connecting means which are substantially coplanar.

In accordance with yet another aspect of the present invention, a flexible shaft coupling is provided for transferring rotational motion from an input shaft to an output shaft and comprising a coupler member arranged to engage the input shaft. An intermediate member is connected to said coupler member, and a first means is provided for connecting the intermediate member to the output shaft. The intermediate member is connected to the output shaft to permit movement of the intermediate member relative to the output shaft by rotation about a first pivot axis perpendicular to the axis of the output shaft. A second means is provided for connecting the coupling member to the intermediate member to locate the intermediate member with respect to the input shaft along the axis thereof and to permit rotation of the intermediate member about a second pivot axis perpendicular to the axis of the input shaft and perpendicular to the first pivot axis. The first and second connecting means permit first and second transverse movement of the intermediate member with respect to the axis of the input shaft and parallel to the first and second pivot axes whereby movement of the input shaft transverse to the axis thereof is not transmitted to the output shaft.

Various means for practicing the invention and other features and advantages thereof will be apparent from the following detailed description of an illustrative, preferred embodiment, reference being made to the accompanying drawings.

BRIEF DESCRIPTION OF THE DRAWINGS

FIG. 3 is a partially exploded perspective illustration of a third embodiment of the coupling of the present invention;

FIG. 4 is a perspective illustration of a fourth embodiment of the coupling of the present invention;

DESCRIPTION OF THE PREFERRED EMBODIMENT

Figures 1, 2:
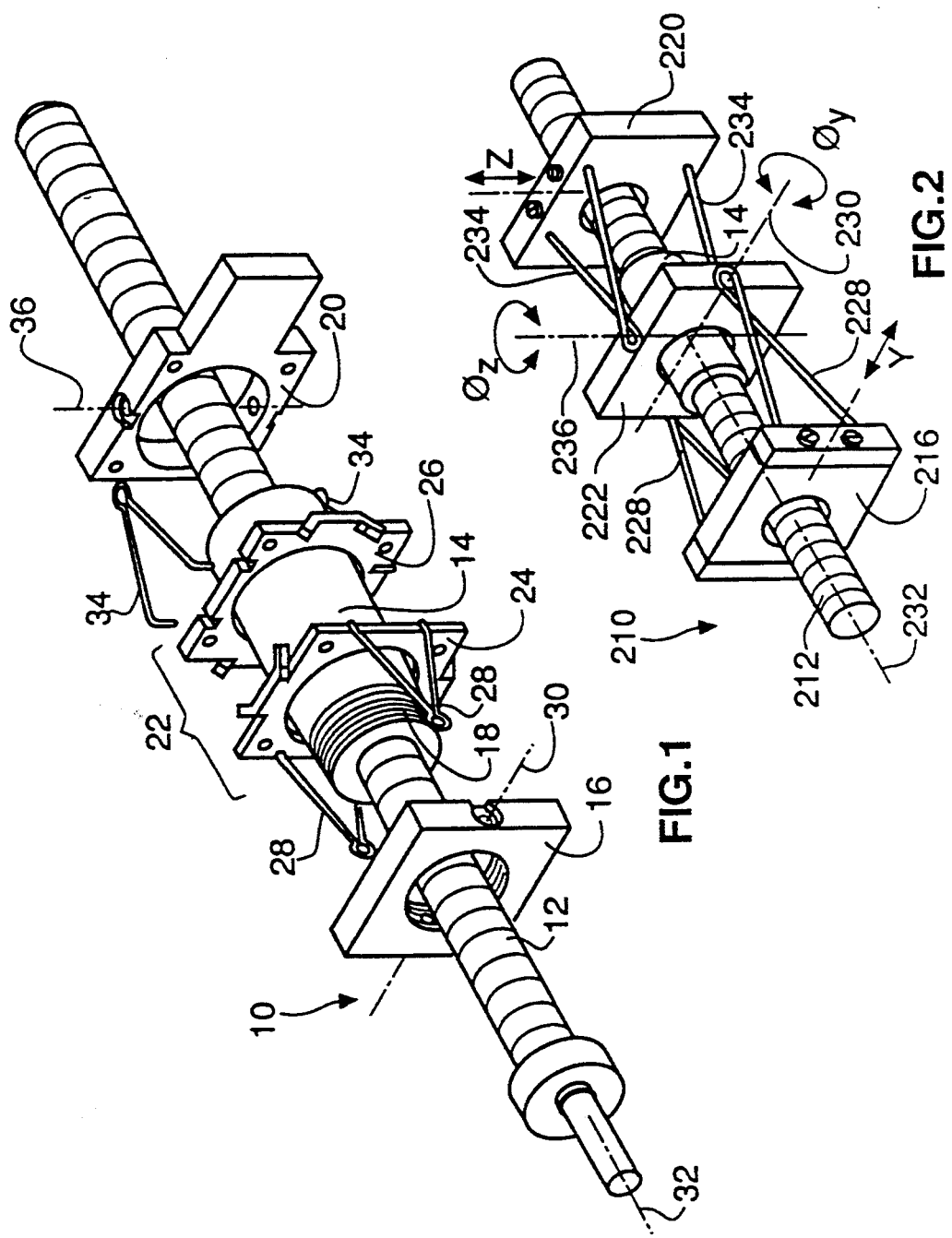
FIG. 1 is a partially exploded perspective illustration of a first embodiment of the coupling of the present invention.
FIG. 2 is a perspective illustration of a second embodiment of the coupling of the present invention.

Referring now to FIG. 1, a leadscrew assembly 10 is illustrated comprising a leadscrew 12 and a leadscrew drive nut 14 mounted on the leadscrew. A coupling of the present invention, for transferring motion from the drive nut 14 to a movable carriage, not shown, comprises a coupler member or plate 16 which is disposed around and connected to the drive nut, such as by mating threads 18. A carriage plate 20, or a member which can be connected to, or be part of, and move with the carriage, is also disposed in spaced relationship around the leadscrew in spaced relation to the coupler plate 16. An intermediate member 22, which in this embodiment is comprised of two mating plates 24 and 26, is also disposed in spaced relationship around the leadscrew between the coupler plate 16 and the carriage plate 20.

The intermediate member 22 is connected to the coupler plate 16 by a first connecting means such as a pair of flexure members 28 which are fixed at opposite ends to both the intermediate member and the coupler plate. The flexure members are connected to the coupler plate at a pivot axis 30 which is substantially perpendicular to the axis 32 of the leadscrew, and are fixedly connected at the intermediate member end. A second pair of flexure members 34 connect the intermediate member 22 to the carriage plate 20. The second Pair of flexure members are also rigidly connected to the intermediate member end and are connected to the carriage plate at a pivot axis 36, which is substantially perpendicular to the leadscrew axis and also substantially perpendicular to pivot axis 30. Thus, the second pair of flexure members is oriented 90° to the first pair. As illustrated, the intermediate member 22 is formed of two mating plates 24 and 26 which rigidly hold the ends of both pairs of the flexure members when the plates are tightly fastened together by means of screws or the like, not shown.

The flexure assembly must be very stiff in the direction of the leadscrew axis and about the leadscrew axis. By flexing, the flexure members permit relative movement of the intermediate member rotationally about axes 30 and 36, as well as perpendicularly to these axes. The flexure members have a sufficiently high aspect ratio of length to diameter that they permit the intermediate member 22 to move in the plane perpendicular to the leadscrew axis without permitting movement along the leadscrew axis. The flexure members must be stout enough that they will not buckle under the load being transferred form the leadscrew drive nut to the carriage, yet they must permit the small transverse motion of the leadscrew without transferring that motion to the carriage. Thus, the coupler of the present invention prevents the transfer of the once-per-revolution errors in the leadscrew to the carriage.

Alternative Embodiments

A first alternative embodiment is illustrated in FIG. 2, similar to the embodiment of FIG. 1, wherein similar components are identified with similar reference numbers with the prefix "2". In this embodiment both pivot axes 230 and 236 are located in the same plane in intermediate member 222. Although the construction of this embodiment may be a bit more complex, the location of both pivot axes in the same plane prevents the introduction of induced motion, such as transverse motion caused by motion about a pivot axis.

A second alternative embodiment is illustrated in FIG. 3, similar to the embodiment of FIG. 1, wherein similar components are identified with similar reference numbers with the prefix "3". In this embodiment the intermediate member 322, the flexure members 328 and 334, and the connecting means for the carriage 320, are all formed from a single sheet of folded sheet metal, for example. Such a construction is very simple and economic to form, and yet provides all of the features and advantages of the preferred embodiment.

A third alternative embodiment is illustrated in FIG. 4, similar to the embodiment of FIG. 1, wherein similar components are identified with similar reference numbers with the prefix "4". In this embodiment, the coupling is folded so that the length thereof is substantially reduced. Moreover, this embodiment provides a common plane for the pivot axes, such as provided by the embodiment illustrated in FIG. 2, except that the common plane passes through the coupling member and the carriage connecting means which are also co-planar.

Figure 5:
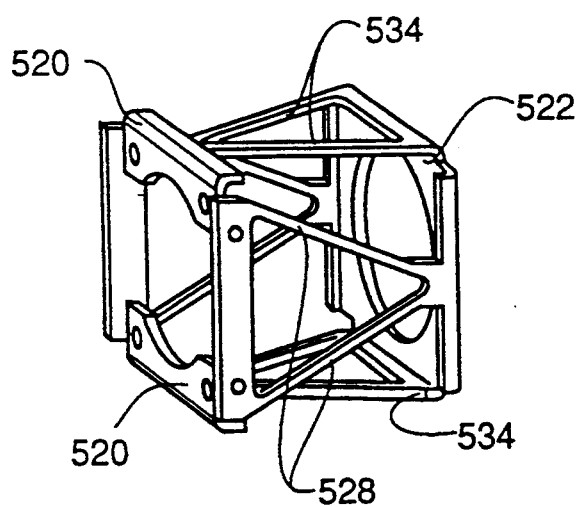
FIG. 5 is a perspective illustration of an intermediate member combining the features of the embodiments illustrated in FIGS. 3 and 4.
Figure 6:
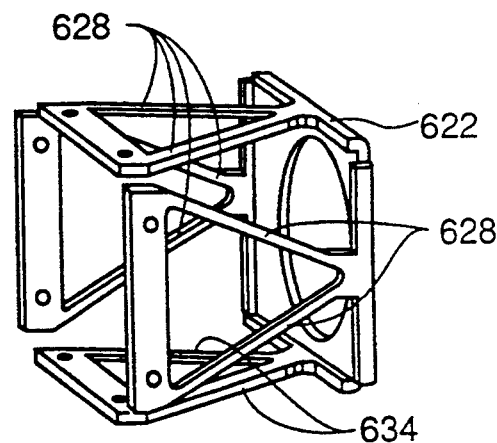
FIG. 6 is a perspective illustration of an intermediate member combining the features of the embodiments illustrated in FIGS. 2, 3 and 4.
Figure 7:
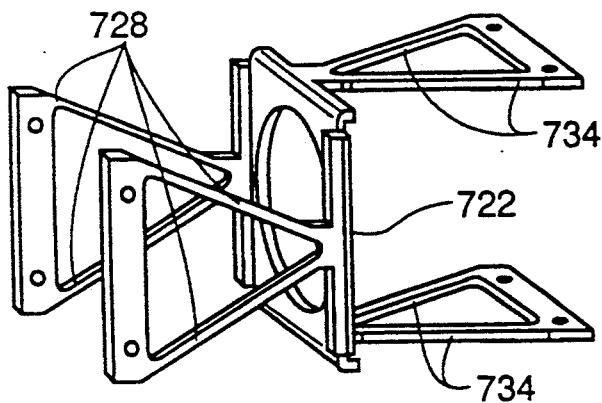
FIG. 7 is a perspective illustration of an intermediate member combining the features of the embodiments illustrated in FIGS. 2 and 3.

FIGS. 5, 6 and 7 illustrate variations of the formed sheet metal coupler construction of FIG. 3. The structure shown in FIG. 5 is for a folded coupler similar to FIG. 4 except that the pivot axes are not in a common plane. The structure shown in FIG. 6 is for the folded coupler of FIG. 4. The structure shown in FIG. 7 is for a coupler like that shown in FIG. 2, wherein the pivot axes are in a common plane in the intermediate member 622.

Figure 8:
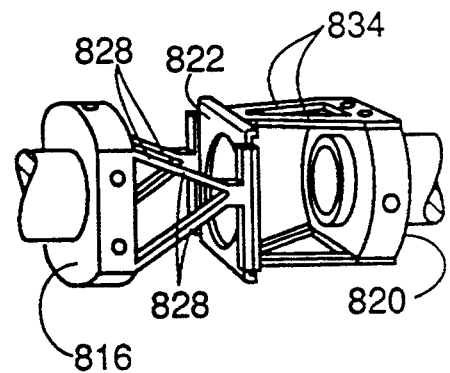
FIG. 8 is a perspective illustration of an intermediate member incorporating the features of the embodiment illustrated in FIG. 7 as a shaft coupling.

FIG. 8 illustrates the use of the coupler of the present invention as a flexible shaft coupling. In this application, the coupler member 816 is connected to an input shaft (not shown), and the connecting means 820 is connected to an output shaft (not shown). With the present coupler, movement of the input shaft transverse to its axis will not be imparted to the output shaft while transmitting the rotation of the input shaft to the output shaft.

Still further, it will be appreciated that the intermediate member can be connected directly to either drive nut or to the carriage without the need for a coupler member or a connector member so long as the form of the connection between the intermediate member and the drive nut or the carriage is the same as that described for the connection between the intermediate member and the coupler and the connector member, i.e. so long as the connection provides the same freedom of movement between the two members as well as the same constraints.

It will thus be seen that the present invention provides a simple, inexpensive leadscrew coupling which corrects for lead screw drunkenness without the need to specify extremely accurately manufactured, and thus very expensive, lead screws for use in systems sensitive to such errors, such as scan printing apparatus. By compensating for once per revolution lead screw errors, the present invention permits the use of much less expensive lead screws.

The invention has been described with reference to specific preferred embodiments and variations thereof, but it will be understood that other variations and modifications can be effected within the spirit and scope of the invention, which is defined by the following claims.

PARTS LIST

10 LEADSCREW ASSEMBLY
(also 210, 310, 410)
12 LEADSCREW
(also 212, 312, 412)
14 DRIVE NUT
also 214, 314, 414)
16 COUPLER PLATE
(also 216, 316, 416, 816)
18 MATING THREADS
(also 318)
20 CARRIAGE PLATE
(also 220, 320, 420, 520, 820)

22 INTERMEDIATE MEMBER
(also 222, 322, 422, 522, 622, 722, 822)
24 MATING PLATE
2 6 MATING PLATE
28 FLEXURE MEMBERS
(also 228, 328, 428, 528, 628, 728, 828)
30 PIVOT AXIS
(also 230, 430)
32 LEADSCREW AXIS
(also 232)
34 FLEXURE MEMBERS
(also 234, 334, 434, 534, 634, 734, 834)
36 PIVOT AXIS
(also 236, 436)

We claim

1. A coupling for transferring motion from a leadscrew to a carriage comprising a coupler member arranged to engage said leadscrew, carriage connecting means for connecting said coupling to said carriage wherein said coupling member and said carriage connecting means are substantially coplanar, an intermediate member connected to said coupler member, first means for connecting said intermediate member to said carriage connecting means to locate said carriage with respect to said leadscrew along the axis of said leadscrew, said intermediate member being connected to said carriage connecting means to permit movement of said intermediate member relative to said carriage by rotation about a first pivot axis substantially perpendicular to the axis of said leadscrew, and second means for connecting said coupling member to said intermediate member to locate said intermediate member with respect to said leadscrew along the axis of said leadscrew and to permit rotation of said intermediate member about a second pivot axis substantially perpendicular to the axis of said leadscrew and substantially perpendicular to said first pivot axis wherein said first and second pivot axes pass through both said coupler member and said carriage connecting means, said first and second connecting means permitting first and second transverse movement of said carriage connecting means substantially perpendicular to the axis of said leadscrew and parallel to said first and second pivot axes whereby movement of the leadscrew transverse to the axis thereof is not transmitted to said carriage.

2. A leadscrew coupling according to claim 1 wherein said first and second connecting means are flexure members.

3. A leadscrew coupling according to claim 1 wherein said first pivot axis passes through said carriage connecting means and said second pivot axis passes through said coupler member.

4. A leadscrew coupling according to claim 1 wherein said first and second connecting means and said intermediate member are integrally formed from a single sheet member.

5. A leadscrew coupling according to claim 1 wherein said first and second connecting means, said intermediate member and said carriage connecting means are integrally formed from a single sheet member.

6. A flexible shaft coupling for transferring rotational motion from an input shaft rotatable about an axis to an output shaft rotatable about an axis, said coupling comprising:

a coupler member arranged to engage said input shaft, means for connecting said coupling to said output shaft, an intermediate member connected to said coupler member, first means for connecting said intermediate member to said output shaft connecting means, said intermediate member being connected to said output shaft to permit movement of said intermediate member relative to said output shaft by rotation about a first pivot axis substantially perpendicular to and intersecting the axis of said output shaft, and second means for connecting said coupling member to said intermediate member to locate said intermediate member with respect to said input shaft along the axis of said input shaft and to permit rotation of said intermediate member about a second pivot axis substantially perpendicular to and intersecting the axis of said input shaft and substantially perpendicular to said first pivot axis, said first and second connecting means permitting first and second transverse movement of said intermediate member substantially perpendicular to the axis of said input shaft and parallel to said first and second pivot axes whereby movement of the input shaft transverse to the axis thereof is not transmitted to said output shaft.

7. A coupling for transferring motion from a leadscrew, rotatable about an axis, to a carriage comprising:

a coupler member arranged to move along said leadscrew when the leadscrew rotates about its axis;

carriage connecting means for connecting said coupling to a carriage;

an intermediate member;

first means for connecting said intermediate member to said carriage connecting means to permit movement of said intermediate member relative to said carriage connecting means by rotation about a first pivot axis substantially perpendicular to and intersecting the axis of the leadscrew; and second means for connecting said coupling member to said intermediate member to permit rotation of said intermediate member about a second pivot axis substantially perpendicular to and intersecting the axis of the leadscrew and substantially perpendicular to said first pivot axis such that said first and second connecting means permit first and second transverse movement of said carriage connecting means substantially perpendicular to the axis of said leadscrew and parallel to said first and second pivot axes, whereby movement of the leadscrew transverse to the axis thereof is not transmitted to said carriage, said first and second connecting means and said intermediate member being integrally formed from a single sheet member.

8. A coupling as defined in claim 7 wherein said first and second connecting means, said carriage connecting means, and said intermediate member are integrally formed from a single sheet member.

9. A leadscrew coupling according to claim 7 wherein said first and second connecting means are flexure members.

10. A leadscrew coupling according to claim 7 wherein said first pivot axis passes through said carriage connecting means and said second pivot axis passes through said coupler member.

11. A leadscrew coupling according to claim 7 wherein said first and second pivot axes both pass through said intermediate member.

* * * * *